US009791889B2

United States Patent
Mihara et al.

(10) Patent No.: US 9,791,889 B2
(45) Date of Patent: *Oct. 17, 2017

(54) ELECTRONIC DEVICE AND INFORMATION PROCESSING APPARATUS

(71) Applicant: FUJITSU LIMITED, Kawasaki-shi, Kanagawa (JP)

(72) Inventors: Daisuke Mihara, Kawasaki (JP); Takanao Kominami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,625

(22) Filed: Mar. 1, 2016

(65) Prior Publication Data
US 2016/0179138 A1    Jun. 23, 2016

Related U.S. Application Data

(63) Continuation of application No. PCT/JP2013/005461, filed on Sep. 13, 2013.

(51) Int. Cl.
*G06F 1/16* (2006.01)
*G06F 1/20* (2006.01)

(52) U.S. Cl.
CPC .......... *G06F 1/1632* (2013.01); *G06F 1/1626* (2013.01); *G06F 1/1637* (2013.01);
(Continued)

(58) Field of Classification Search
CPC ............................... G06F 1/1632; G06F 1/203
(Continued)

(56) References Cited

U.S. PATENT DOCUMENTS 5,607,135 A * 3/1997 Yamada ............... A47B 23/043
248/447
5,682,182 A    10/1997 Tsubosaka
(Continued)

FOREIGN PATENT DOCUMENTS

JP    H07-107419 A    4/1995
JP    7-219450 A    8/1995
(Continued)

OTHER PUBLICATIONS

International Search Report and Written Opinion of the International Searching Authority (Form PCT/ISA/210, Form PCT/ISA/220, Form PCT/ISA/237), dated Nov. 12, 2013 in connection with PCT/JP2013/005461(15 pages).
(Continued)

*Primary Examiner* — Adrian S Wilson
(74) *Attorney, Agent, or Firm* — Fujitsu Patent Center

(57) ABSTRACT

A device includes: a main unit that has a width smaller than a width of a display unit including a touch panel that detects a touch operation, the main unit being structured so that the display unit is provided on the main unit in a state in which the display unit includes a portion that does not overlap the main unit; a bottom portion coupled to the main unit, the bottom portion being placed on a mounting surface so as to be in contact with the mounting surface when the device is mounted on the mounting surface; and a support portion that supports the main unit, the support portion has one end of the support portion coupled to the main unit and another end of the support portion disposed in a direction away from the main unit with a space left between the another end and the main unit.

18 Claims, 22 Drawing Sheets

(52) U.S. Cl.
CPC .............. *G06F 1/1643* (2013.01); *G06F 1/20* (2013.01); *G06F 2200/1631* (2013.01)

(58) Field of Classification Search
USPC .................................................... 361/679.41
See application file for complete search history.

(56) References Cited

U.S. PATENT DOCUMENTS

| | | | |
|---|---|---|---|
| 6,084,769 | A | 7/2000 | Moore et al. |
| 6,094,341 | A | 7/2000 | Lin |
| 6,239,971 | B1 | 5/2001 | Yu et al. |
| 6,256,193 | B1 | 7/2001 | Janik et al. |
| 6,266,241 | B1 | 7/2001 | Van Brocklin et al. |
| 6,542,360 | B2 | 4/2003 | Koizumi |
| 6,545,864 | B2 | 4/2003 | Davis, IV |
| 6,837,057 | B2 | 1/2005 | Pokharna et al. |
| 6,845,008 | B2 | 1/2005 | Pokharna et al. |
| 6,894,896 | B2 | 5/2005 | Lin |
| D543,209 | S | 5/2007 | Bae |
| 7,301,765 | B2 | 11/2007 | Huang |
| 7,861,995 | B2 * | 1/2011 | Liou .................... F16M 11/105 248/454 |
| 8,230,992 | B2 * | 7/2012 | Law ...................... G06F 1/1626 206/320 |
| 8,800,763 | B2 * | 8/2014 | Hale .................... F16M 11/041 206/320 |
| 8,910,915 | B2 * | 12/2014 | Wibby ................. A47B 23/043 206/45.2 |
| 9,377,810 | B2 * | 6/2016 | Hishinuma ........... G06F 1/1613 |
| 2001/0007525 | A1 | 7/2001 | Tracy |
| 2001/0030851 | A1 | 10/2001 | Usui et al. |
| 2001/0033475 | A1 | 10/2001 | Lillios et al. |
| 2002/0018335 | A1 | 2/2002 | Koizumi |
| 2003/0058615 | A1 | 3/2003 | Becker et al. |
| 2003/0072133 | A1 | 4/2003 | Chuang |
| 2004/0047124 | A1 | 3/2004 | Hsieh et al. |
| 2004/0057199 | A1 | 3/2004 | Azuchi |
| 2004/0123604 | A1 | 7/2004 | Pokharna et al. |
| 2004/0190234 | A1 * | 9/2004 | Lin ......................... G06F 1/162 361/679.28 |
| 2004/0233631 | A1 | 11/2004 | Lord |
| 2005/0161197 | A1 | 7/2005 | Rapaich |
| 2009/0141439 | A1 * | 6/2009 | Moser .................. G06F 1/1616 361/679.29 |
| 2010/0014235 | A1 * | 1/2010 | Huang .................. G06F 1/1654 361/679.09 |
| 2010/0090085 | A1 * | 4/2010 | Corrion ................ A47B 23/043 248/459 |
| 2010/0122924 | A1 * | 5/2010 | Andrews .................. A45C 9/00 206/320 |
| 2011/0253850 | A1 * | 10/2011 | Bau ......................... H04M 1/04 248/176.3 |
| 2012/0160456 | A1 | 6/2012 | Aoki |
| 2012/0170212 | A1 * | 7/2012 | Gallouzi .............. F16M 11/041 361/679.56 |
| 2012/0181195 | A1 * | 7/2012 | Lu ......................... A45C 11/00 206/320 |
| 2013/0114198 | A1 * | 5/2013 | Gengler ................. B65D 25/00 361/679.08 |
| 2013/0216067 | A1 | 8/2013 | McClure et al. |
| 2016/0187926 | A1 * | 6/2016 | Mihara ..................... G06F 1/20 361/679.3 |

FOREIGN PATENT DOCUMENTS

| | | |
|---|---|---|
| JP | 2001-147745 A | 5/2001 |
| JP | 2001-177267 A | 6/2001 |
| JP | 2003-309637 A | 10/2003 |
| JP | 2004-39861 A | 2/2004 |
| JP | 2004-354445 A | 12/2004 |
| JP | 2005-86006 A | 3/2005 |
| JP | 2011-169361 A | 9/2011 |
| JP | 2011-169361 A | 10/2011 |
| JP | 2011-215709 A | 10/2011 |
| JP | 2012-141082 A | 7/2012 |
| WO | 2011/084186 A1 | 7/2011 |

OTHER PUBLICATIONS

International Search Report and Written Opinion of the International Searching Authority (Form PCT/ISA/210, Form PCT/ISA/220, Form PCT/ISA/237), dated Nov. 12, 2013 for Application No. PCT/JP2013/005460 (11 pages).
U.S. Notice of Allowance dated Mar. 2, 2017 for related U.S. Appl. No. 15/062,333 [allowed].
JPOA—Japanese Office Action dated Jan. 10, 2017 for Japanese Patent Application No. 2015-536298, with English translation.
U.S. Notice of Allowance dated Apr. 11, 2017 for related U.S. Appl. No. 15/062,333 [allowed].

* cited by examiner

ELECTRONIC DEVICE AND INFORMATION PROCESSING APPARATUS

CROSS-REFERENCE TO RELATED APPLICATION

This application is a continuation application of International Application PCT/JP2013/005461 filed on Sep. 13, 2013 and designated the U.S., the entire contents of which are incorporated herein by reference.

FIELD

The embodiment discussed herein is related to an electronic device and an information processing apparatus.

BACKGROUND

Some of desktop computers, mobile telephone terminals, mobile information terminals, tablet terminals, and other electronic devices used by users use a touch panel as an input device. These electronic devices may be mounted on a cradle (holder). When an electronic device is mounted on a cradle, the electronic device can be connected to it. A cradle can thereby be used to interconnect the main unit of the electronic device and another electronic device with a cable so that data synchronization is maintained between these electronic devices and files are transmitted and received between them. Another usage of the cradle is to charge the main unit. Some cradles have a universal serial bus (USB) port, enabling a keyboard, a modem, or another peripheral device to be connected to a mobile terminal.

Particularly, dominant tablet terminals use a touch panel as an input device. The user holds the main unit of a tablet terminal with one hand and performs a touch operation with the other hand. The tablet terminal is used at least as a display unit, and the touch panel is used as an input device.

A tablet terminal is used to view a moving picture and still images, in which case the tablet terminal is mounted on a cradle and reproduces the moving picture and still images. In other usages as well, the tablet terminal accepts operation commands made by touch operations.

Japanese Laid-open Patent Publication No, 2011-215709 is known as an example of related art.

SUMMARY

According to an aspect of the invention, an electronic device includes: a main unit that has a width smaller than a width of a display unit including a touch panel that detects a touch operation, the main unit being structured so that the display unit is provided on the main unit in a state in which the display unit includes a portion that does not overlap the main unit; a bottom portion coupled to the main unit, the bottom portion being placed on a mounting surface so as to be in contact with the mounting surface when the electronic device is mounted on the mounting surface; and a support portion that supports the main unit, the support portion has one end of the support portion coupled to the main unit and another end of the support portion disposed in a direction away from the main unit with a space left between the another end and the main unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
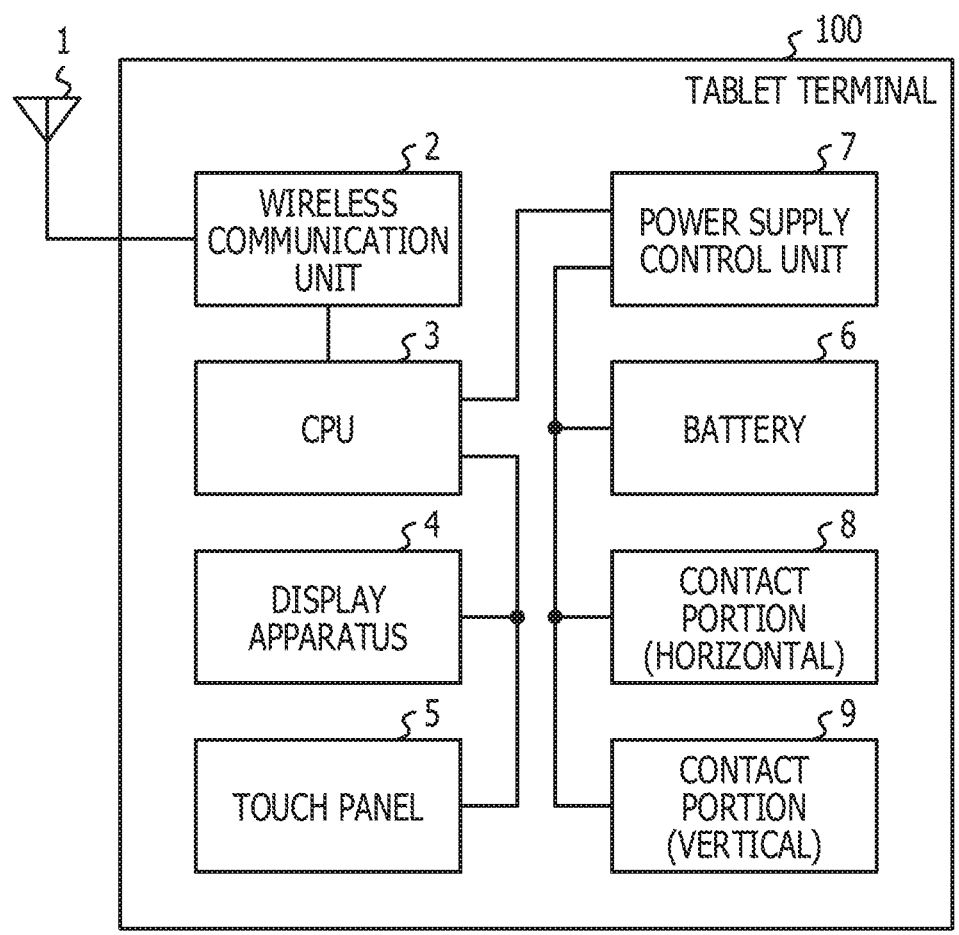
FIG. 1 is a schematic view illustrating the hardware structure of a tablet terminal according to a first embodiment.

Desktop computers, mobile telephone terminals, mobile information terminals, and other electronic devices that use a touch panel as an input unit may be mounted on a desk or the like for use of them. An object in this situation is to achieve stability so that, due to a force applied by a touch operation, the electronic device is not displaced from the position at which it is mounted.

When a tablet terminal is mounted on a cradle mounted on a desk or the like, an operation command is entered into the tablet terminal by a touch operation. In this situation, an object is to assure stability for the cradle against this touch operation performed on a tablet terminal mounted on a cradle.

New problems found by the inventor of this application will be described together with solutions to the problems.

(First Problem)

Some computers, mobile telephone terminals, mobile information terminals, tablet terminals, and other electronic devices mounted on a desk or the like and used by a user have a display unit to which a touch panel that detects a touch operation is attached and also have a main unit, in which an information processing unit that processes information to be displayed on the display unit is accommodated, the display unit and main unit being integrally formed. There is another electronic device that has a tablet terminal used as a display unit and a cradle used as a main unit, in which an information processing unit is accommodated, separately; the main unit is mounted on a desk or the like and the tablet terminal is mounted on a mounting portion provided as part of the main unit, making the electronic device ready for use.

If the size of the display unit to which the touch panel is attached is larger than the main unit, in which an information processing unit is accommodated, that is, the display unit is disposed so that at least part of it protrudes from the main unit, a force applied to the display unit due to a touch operation to one end at the upper portion of the display unit works a force with which the mounted main unit falls down. Particularly, when the main unit and display unit are provided separately, in which case, if the size of the display unit to which the touch panel is attached is larger than the main unit, in which an information processing unit is accommodated, the upper portion of the display unit mounted on the main unit protrudes from the main unit. When an end of the upper portion of the display unit is touched, a force applied to the display unit due to the touch operation is exerted on one end of the upper portion of the main unit. Due to the principle of leverage, the force applied to the display unit is exerted on one end of the upper portion of the main unit as a large force. Accordingly, the mounted display unit may be separated from the mounting portion or may fall down together with the main unit.

As described above, the inventor of this application found that stability against a touch operation performed on an information processing apparatus that has a display unit to which a touch panel is attached and a main unit in which an information processing unit is accommodated is a problem to be solved. Examples of an electronic device and an information processing apparatus according to an embodiment described below will be described in detail with reference to the drawings.

Recently, tablet terminals are demanded to have high performance and a thin case, to be lightweight, and to achieve power saving. A possible solution to this demand is to use, as a cradle, an electronic device that transmits display data to the display unit of a tablet terminal in wireless communication and to causes the display unit to display the data. In this case, an electric shield may be provided between the tablet terminal and the mounting portion of the cradle on which the tablet terminal is mounted so that the tablet terminal is not affected by electric noise. If the mounting portion is shielded, unless an antenna that receives display data in wireless communication is mounted at a position outside an area within which the antenna comes into contact with the mounting portion, the antenna fails to easily receive display data. With a tablet terminal, therefore, at least an antenna is disposed at a position outside an area within which the antenna comes into contact with the mounting portion of the cradle. Accordingly, the tablet terminal becomes larger than the main unit, in which an information processing apparatus is accommodated, so the above problem with stability may become noticeable.

(First Solution)

As a solution to the first problem, an electronic device may have: an information processing unit that processes information to be displayed on a display unit to which a touch panel that detects a touch operation is attached; a main unit in which the information processing unit is accommodated, the display unit being provided on the main unit so that at least part of the display unit protrudes from the main unit; a bottom portion connected to the main unit, the bottom portion being placed on a mounting surface so as to be in contact with the mounting surface, the electronic device being mounted on the mounting surface; and a support portion, one end of which is connected to the main unit and the other end of which is disposed at a distant from the main unit in a direction away from the display unit side of the main unit, the length of the support being enough for the other end to come into contact with the mounting surface when the bottom portion is in contact with the mounting surface. Thus, the support portion of the electronic device can support the main unit against a force applied by a touch operation to part of the display unit protruding from the main unit.

(Second Problem)

If hardware that implements processing functions, such as a personal computer (PC), is mounted in the main unit such as a cradle, it is desirable to exhaust heat buildup in the main and inhales air from the outside into the main unit.

Particularly, when an information processing unit that transmits display data to the display unit of a tablet terminal or the like in wireless communication and causes the display unit to display the data is accommodated in a cradle, hardware that implements the functions of the PC is mounted in the main unit of the cradle. The hardware is, for example, a central processing unit (CPU), a hard disk drive (HDD), an optical disk drive (ODD), and the like. Display data created in processing by the information processing unit in the cradle is transmitted to the display unit of the tablet terminal or the like in wireless communication and is then displayed. With a tablet terminal in this form, thickness reduction, weight reduction, power saving, and high performance can be achieved for the tablet terminal.

When, however, hardware that implements PC functions is mounted in the cradle, a problem arises in that heat buildup in the case of the cradle is desirably exhausted and air is desirably inhaled from the outside, that is, air cooling is desirable. As for an electronic device or information processing apparatus for which air cooling is desirable, a technology in which a fan or the like is incorporated to exhaust hot air to the outside of the information processing apparatus is known.

To keep noise and exhausted heat from the user, an outlet port used to exhaust the hot air is preferably formed at a position on the rear of the main unit of the cradle when the display unit of the tablet terminal mounted on the cradle is taken as the front. Since hot air tends to rise, if an outlet port is formed at an upper position of the information processing apparatus, heat in the information processing apparatus is efficiently exhausted to the outside. However, dust easily enters the outlet port formed at the upper position of the information processing apparatus, so the outlet port is likely to be clogged with dust. Since the outlet port of this type is located at a position close to the user, noise may become large to the user.

A conventional electronic device or information processing apparatus that is desirably air-cooled may inhale air outside the apparatus. Since hot air tends to rise, if air is inhaled from a lower portion of the apparatus, efficient cooling is achieved because the inhaled air is warmed and become hot and the hot air raises and is exhausted.

If a support portion is provided to solve the first problem, the support portion has an effect as an outlet port cover as well that suppresses the outlet port from being clogged with dust. During an attempt to integrate the support portion and the bottom portion of the cradle together to simplify their installation, the problem that exhausted hot air is inhaled was found.

(Second Solution)

A possible solution is to release the exhausted air by reducing the width of the support portion. However, to assure a stable support portion against a touch operation to the right or left end of the display unit, the support portion desirably has a width that is large to a certain extent. A solution to the second problem is to form, in the support portion, an opening through which hot air exhausted from the outlet port along the support portion is released. This suppresses exhausted hot air from being inhaled again into the main unit while stability against touch operations is assured. In addition, one end of the support portion is connected to the main unit and the other end is disposed at a distant from the main unit in a direction away from the display unit side of the main unit, and the width of the support portion is more reduced toward the other end. This can suppress exhausted hot air from being inhaled again into the main unit.

(Third Problem)

An air flow path through which air is inhaled and exhausted is formed with the outlet port formed at an upper position on the rear of the main unit of the cradle, an inlet port formed at a lower position on the rear, the support portion, and a bottom plate. Therefore, it is preferable for a circuit board, parts, and the like to be mounted so that the air flow path is not impeded in the main unit of the cradle as well.

(Third Solution)

A solution to the third problem is to provide a fan so that air to be exhausted flows toward the outlet port along the support portion. In addition, a circuit board, parts, and the like are placed along the rear surface of the main unit of the cradle so that air in the main unit easily flows.

(Fourth Problem)

When a fan is provided on the circuit board or the like, a heat sink is preferably placed so that air blown from the fan comes into contact with the heat sink.

(Fourth Solution)

A solution to the fourth problem is to, when a fan is provided at an oblique angle as a solution to the above third problem, place a heat sink so that air blown from the fan comes into contact with the heat sink.

So far, the problems that the inventor found and solutions to them have been described. Examples of an electronic device and an information processing apparatus according to one embodiment will be described in detail with reference to the drawings. These examples do not restrict the disclosed technology.

FIG. 1 is a schematic view illustrating the hardware structure of a tablet terminal 100 according to a first embodiment. As illustrated in FIG. 1, the tablet terminal 100 includes, for example, a wireless communication unit 2, which is a radio frequency (RF) circuit having an antenna 1, a CPU 3, a display apparatus 4, such as a display, a touch panel 5 that detects a touch input, a power supply control unit 7 that controls a battery 6, a contact portion 8 for horizontal installation, the contact portion 8 being a contact with a cradle 200 connected to the tablet terminal 100, the cradle 200 having PC functions, and a contact portion 9 for vertical installation, as hardware constituent components. These hardware modules are mutually connected through, for example, a bus.

Figure 2:
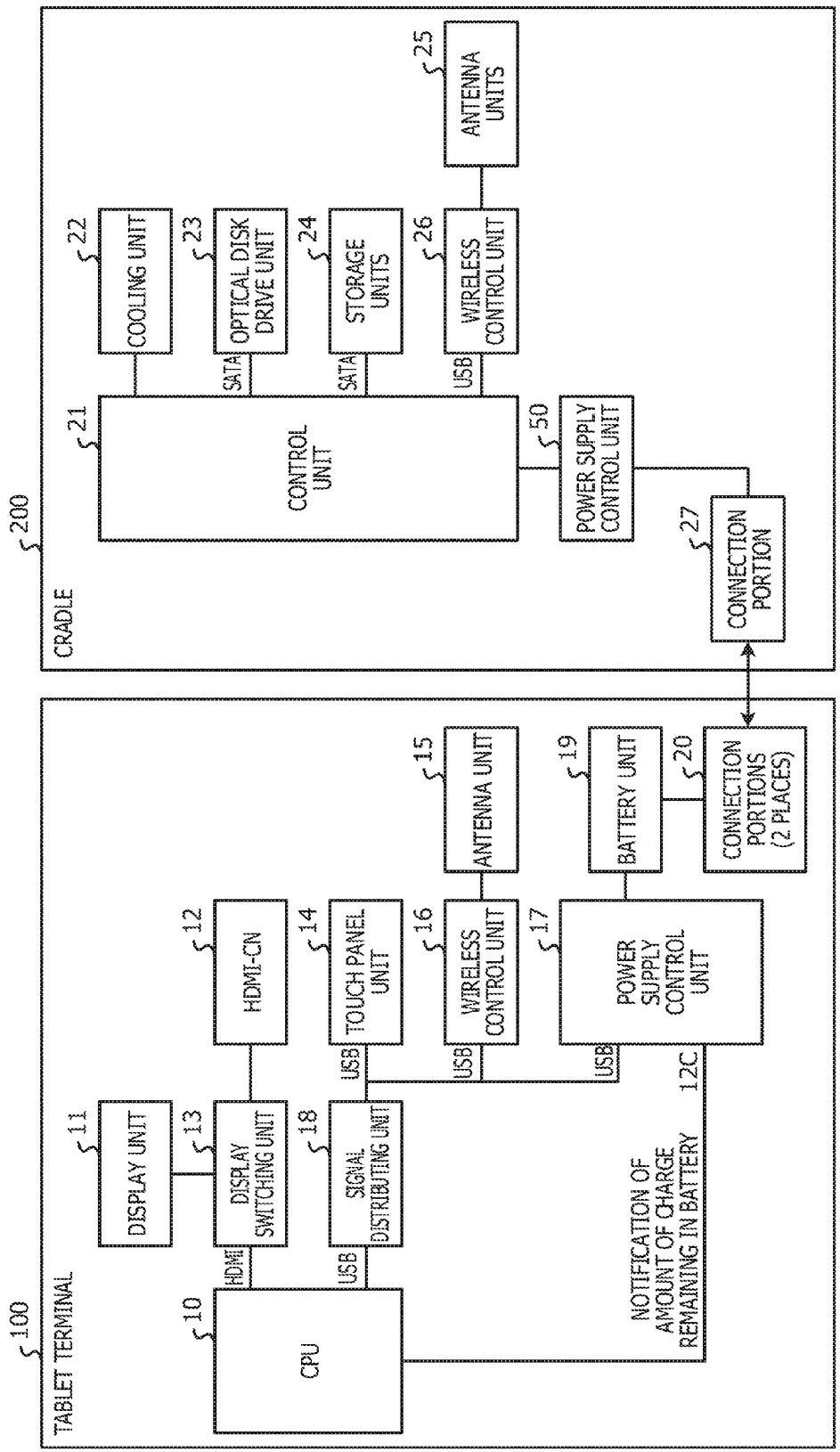
FIG. 2 is a schematic functional block diagram of the tablet terminal and a cradle according to the first embodiment.

FIG. 2 is a schematic functional block diagram of the tablet terminal 100 and cradle 200 according to the first embodiment. As illustrated in FIG. 2, the tablet terminal 100 includes a display switching unit 13 that switches a display between a display unit 11 and an HDMI-CN12 (HDMI is a registered trademark) in response to a command from a control unit 10, a touch panel unit 14 that detects a touch operation to the touch panel 5, a wireless control unit 16 connected to an antenna unit 15 having the antenna 1, the wireless control unit 16 being configured to process received signals, a signal distributing unit 18 that distributes signals received from the control unit 10 to a power supply control unit 17 that controls a power source, a battery unit 19 that accommodates a battery connected to the power supply control unit 17, and connection portions 20 that have the contact portion (horizontal) 8 and contact portion (vertical) 9 so as to supply electric power to the battery unit 19 when one connection portion 20 is connected to the cradle 200.

The cradle 200 includes a cooling unit 22 controlled by a control unit 21, an optical disk drive unit 23, storage units 24, which are such as HDDs, a wireless control unit 26 connected to antenna units 25, and a power supply control unit 50 connected to the tablet terminal 100 through a connection portion 27, the power supply control unit 50 controlling the power source.

The cradle 200 creates display data in processing in the cradle 200 and transmits the created display data to the tablet terminal 100 in wireless communication. The tablet terminal 100 provides a display on the display apparatus 4 of the tablet terminal 100 according to the display data.

Figure 3:
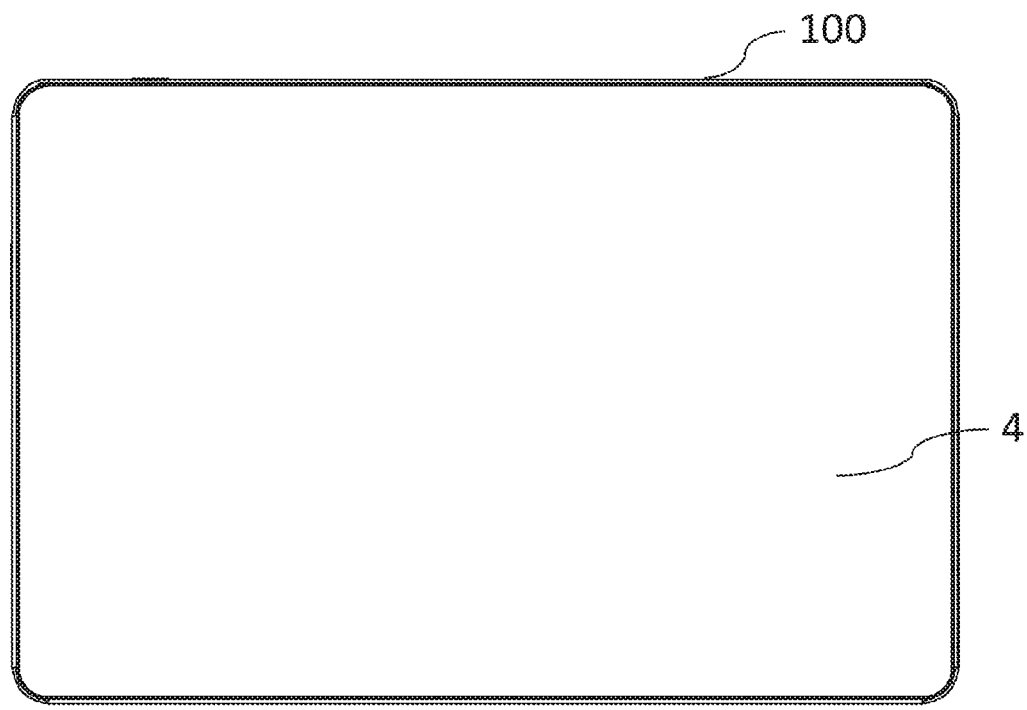
FIG. 3 is a front view of the tablet terminal according to the first embodiment.

FIG. 3 is a front view of the tablet terminal 100 according to the first embodiment. As illustrated in FIG. 3, the tablet terminal 100 has the display apparatus 4, to which a touch panel is attached, on one surface.

Figure 4:
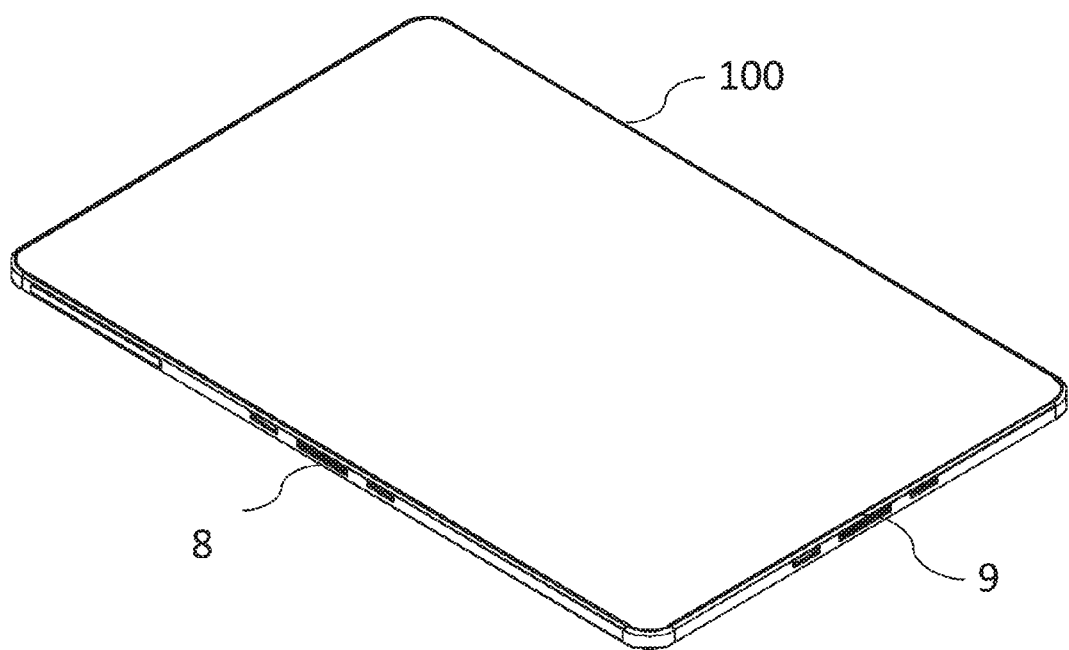
FIG. 4 is a perspective view of the tablet terminal according to the first embodiment.

FIG. 4 is a perspective view of the tablet terminal 100 according to the first embodiment. As illustrated in FIG. 4, the tablet terminal 100 has the contact portion (horizontal) 8 and contact portion (vertical) 9.

Figure 5:
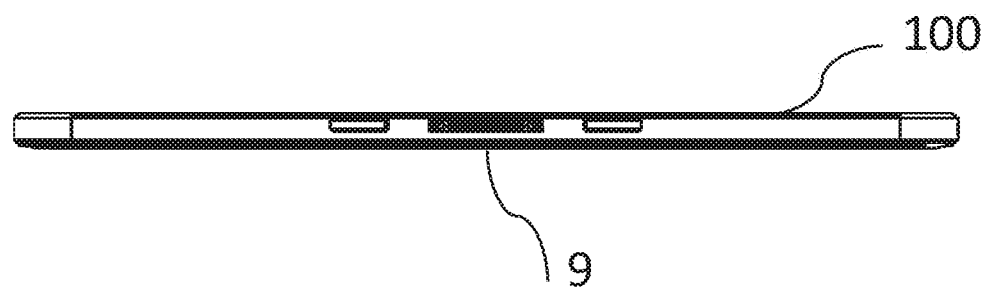
FIG. 5 is a first side view of the tablet terminal according to the first embodiment.

FIG. 5 is a first side view of the tablet terminal 100 according to the first embodiment. As illustrated in FIG. 5, the tablet terminal 100 is rectangular; the tablet terminal 100 has the contact portion (vertical) 9 at the center of a side surface with a shorter edge. When the tablet terminal 100 is mounted on the cradle 200 vertically, the contact portion (vertical) 9 is connected to the connection portion 27 of the cradle 200, charging the battery 6.

Figure 6:
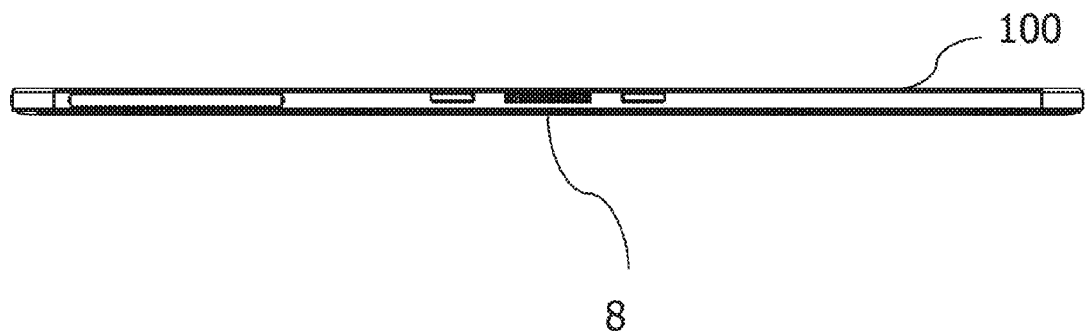
FIG. 6 is a second side view of the tablet terminal according to the first embodiment.

FIG. 6 is a second side view of the tablet terminal 100 according to the first embodiment. As illustrated in FIG. 6, the tablet terminal 100 has the contact portion (horizontal) 8 at the center of a side surface with a longer edge. When the tablet terminal 100 is mounted on the cradle 200 horizontally, the contact portion (horizontal) 8 is connected to the connection portion 27 of the cradle 200, charging the battery 6.

Figure 7:
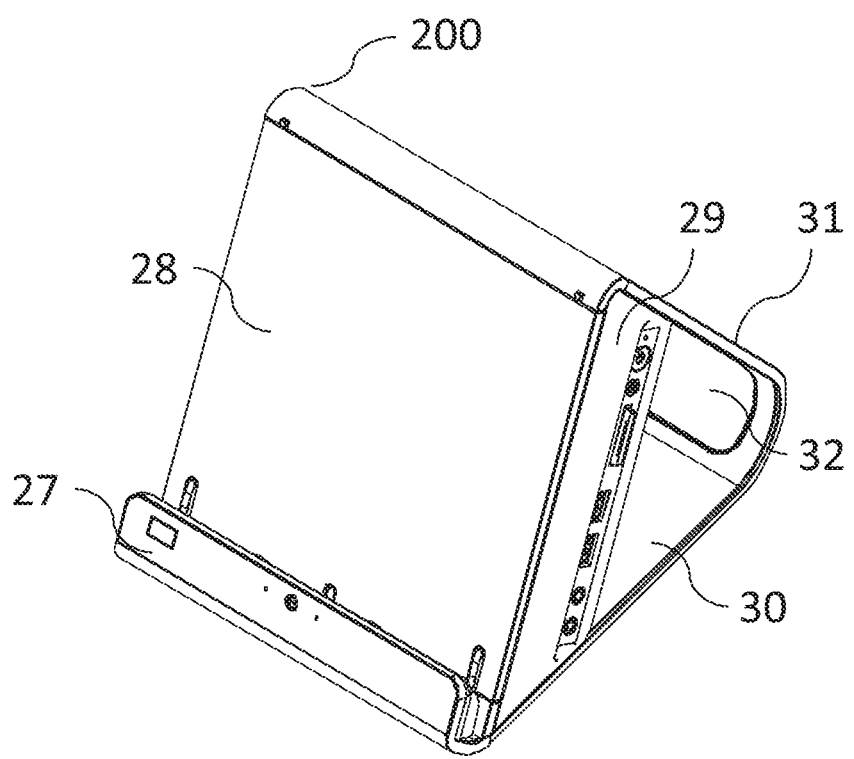
FIG. 7 is a perspective view of the cradle according to the first embodiment.

FIG. 7 is a perspective view of the cradle 200 according to the first embodiment. As illustrated in FIG. 7, the cradle 200 includes a mounting portion 28 on which the tablet terminal 100 is mounted and is connected to the connection portion 27, a main unit 29, a bottom portion 30 connected to the main unit 29, the bottom portion 30 being used to install (place) the cradle 200 on a desk or the like, and a support portion 31 connected to the upper portion of the mounting portion 28, the support portion 31 transmitting a force applied to the mounting portion 28 to a desk or another installation surface (mounting surface) and supporting the cradle 200, and a ventilation hole 32 through which air is exhausted from the main unit 29. The main unit 29 includes a circuit board 33, the cooling unit 22, the optical disk drive unit 23, the storage units 24, and the antenna units 25, as well as a cover 36 that covers these components.

The support portion 31 is connected to one end of the mounting portion 28 with a width that is determined from the width of the mounting portion 28 and the width of the display apparatus 4 of the tablet terminal 100. The support portion 31 extends so as to be in contact with an installation surface, such as a desk, on which the bottom portion 30 is mounted.

Figure 8:
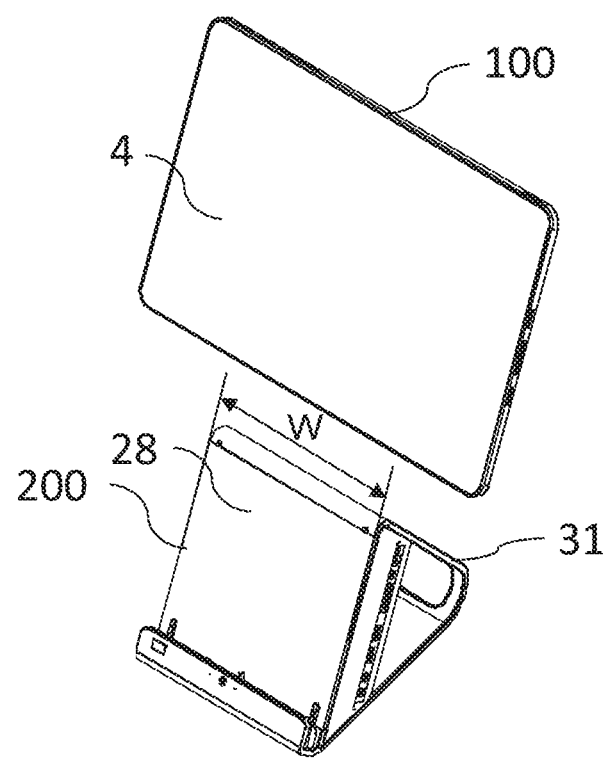
FIG. 8 is a perspective view illustrating a state before the tablet terminal according to the first embodiment is mounted horizontally on the cradle.

FIG. 8 is a perspective view illustrating a state before the tablet terminal 100 according to the first embodiment is mounted horizontally on the cradle 200. When, for example, the tablet terminal 100 is mounted horizontally on the cradle 200, a width W over which the support portion 31 is connected to the mounting portion 28 is determined according to a desirable width that is determined from a force applied when a left end or right end of the display apparatus 4 is touched.

Figure 9:
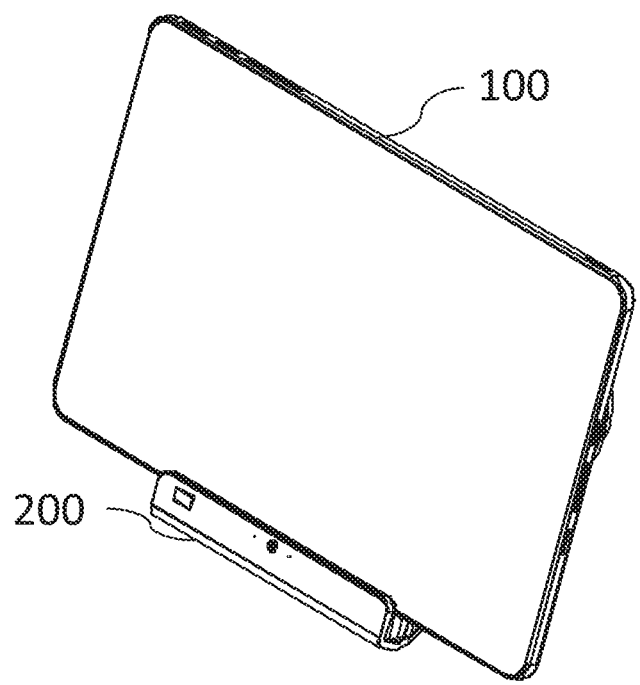
FIG. 9 is a combination view illustrating a state in which the tablet terminal according to the first embodiment is mounted horizontally on the cradle.

FIG. 9 is a combination view illustrating a state in which the tablet terminal 100 according to the first embodiment is mounted horizontally on the cradle 200. As illustrated in FIG. 9, the tablet terminal 100 may be used by the user in a manner in which the tablet terminal 100 is mounted on the cradle 200 so that the display apparatus 4 has a landscape orientation.

Figure 10:
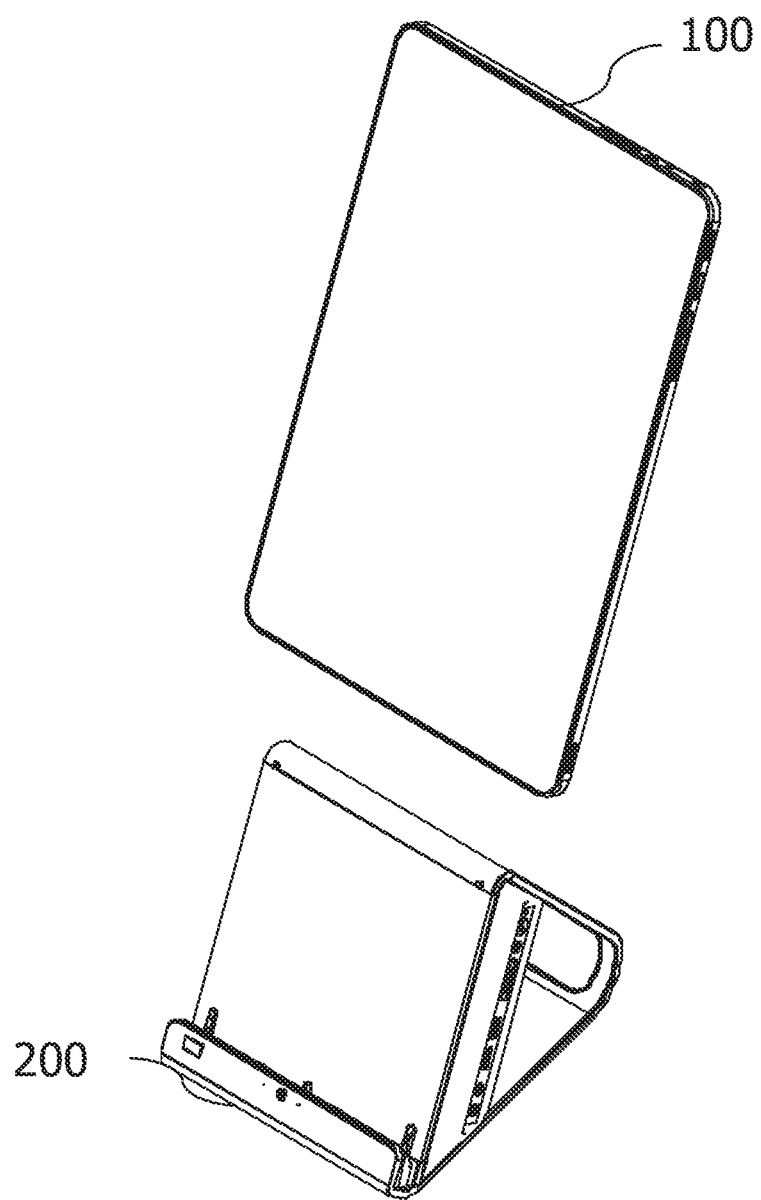
FIG. 10 is a perspective view illustrating a state before the tablet terminal according to the first embodiment is mounted vertically on the cradle.

FIG. 10 is a perspective view illustrating a state before the tablet terminal 100 according to the first embodiment is mounted vertically on the cradle 200.

Figure 11:
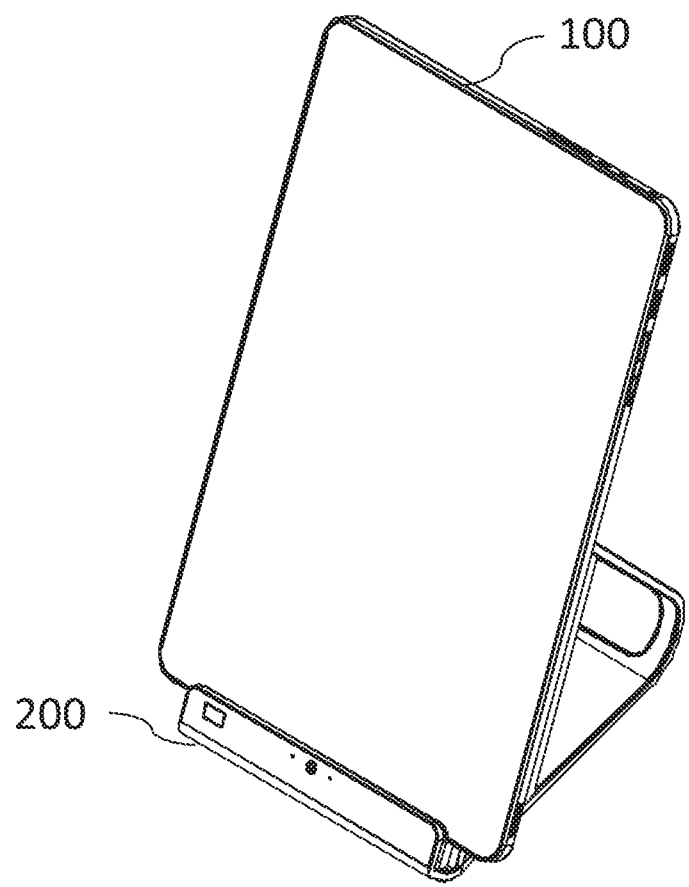
FIG. 11 is a combination view illustrating a state in which the tablet terminal according to the first embodiment is mounted vertically on the cradle.

FIG. 11 is a combination view illustrating a state in which the tablet terminal 100 according to the first embodiment is mounted vertically on the cradle 200. As illustrated in FIG. 11, the tablet terminal 100 may be used by the user in a manner in which the tablet terminal 100 is mounted on the cradle 200 so that the display apparatus 4 has a portrait orientation.

Figure 12:
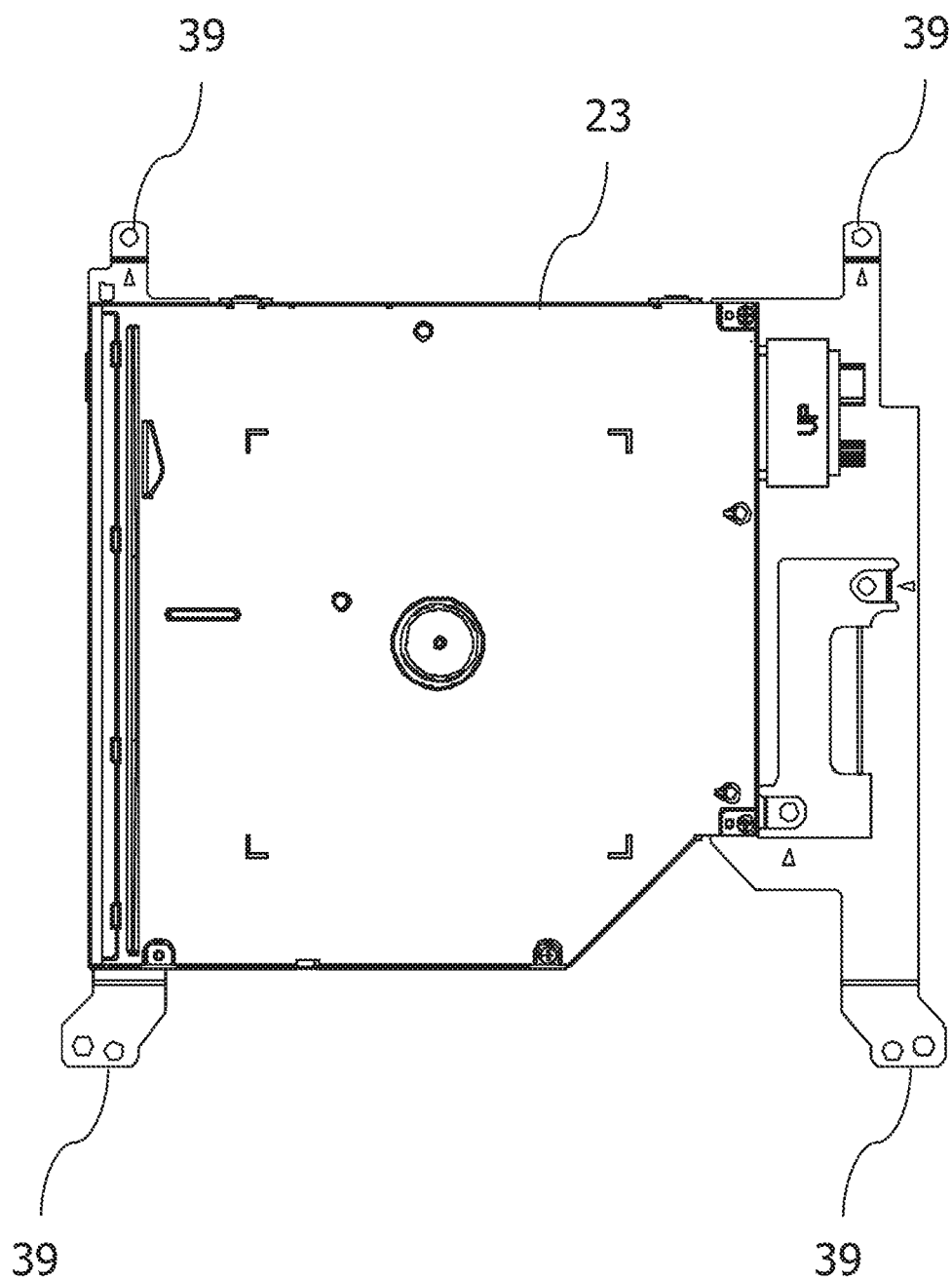
FIG. 12 illustrates an optical disk drive unit accommodated in the main unit of the cradle according to the first embodiment.

FIG. 12 illustrates the optical disk drive unit 23 accommodated in the main unit 29 of the cradle 200 according to the first embodiment. The optical disk drive unit 23 is secured in the main unit 29 of the cradle 200 by securing fixing portions 39 to fixing portions 43 and fixing portions 44 provided on the cover 36, which will be described later, with screws and the like.

Figure 13:
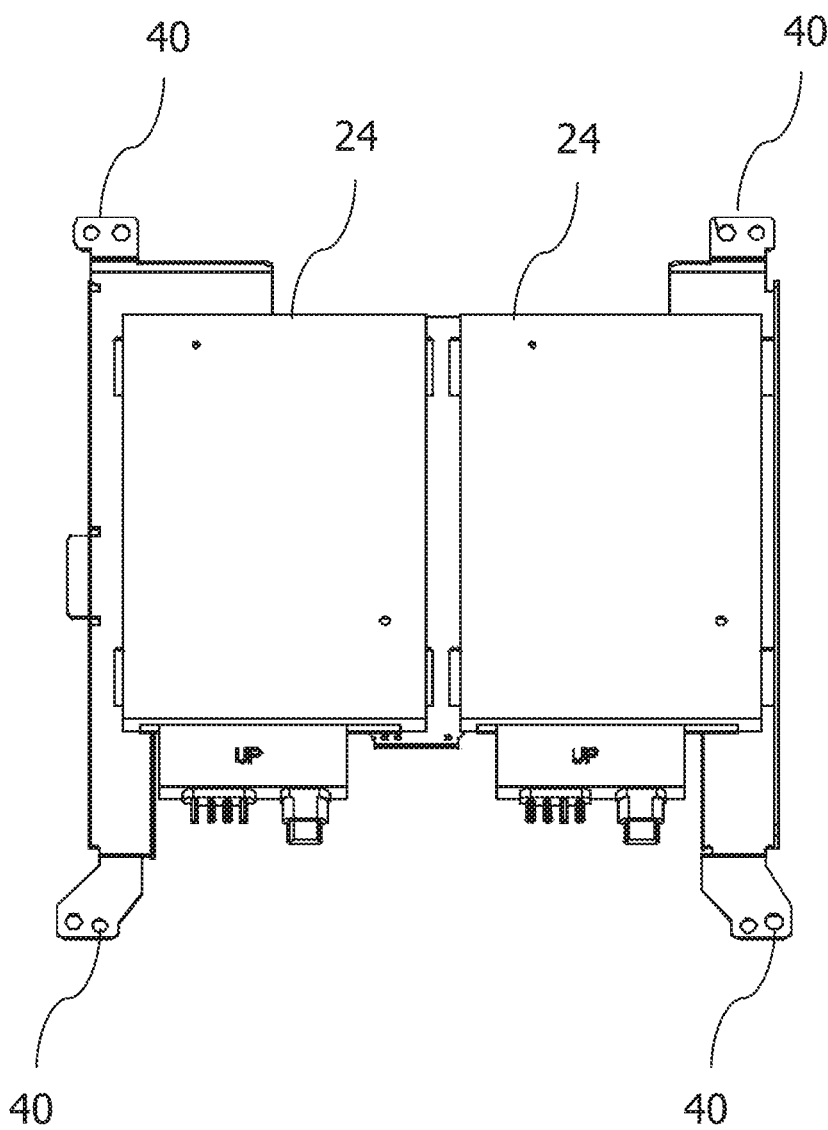
FIG. 13 illustrates storage units accommodated in the main unit of the cradle according to the first embodiment.

FIG. 13 illustrates the storage units 24 accommodated in the main unit 29 of the cradle 200 according to the first embodiment. The storage units 24, which are such as HDDs, are secured in the main unit 29 of the cradle 200 by securing fixing portions 40 to fixing portions 44 and fixing portions 45 provided on the cover 36 with screws and the like.

Figure 14:
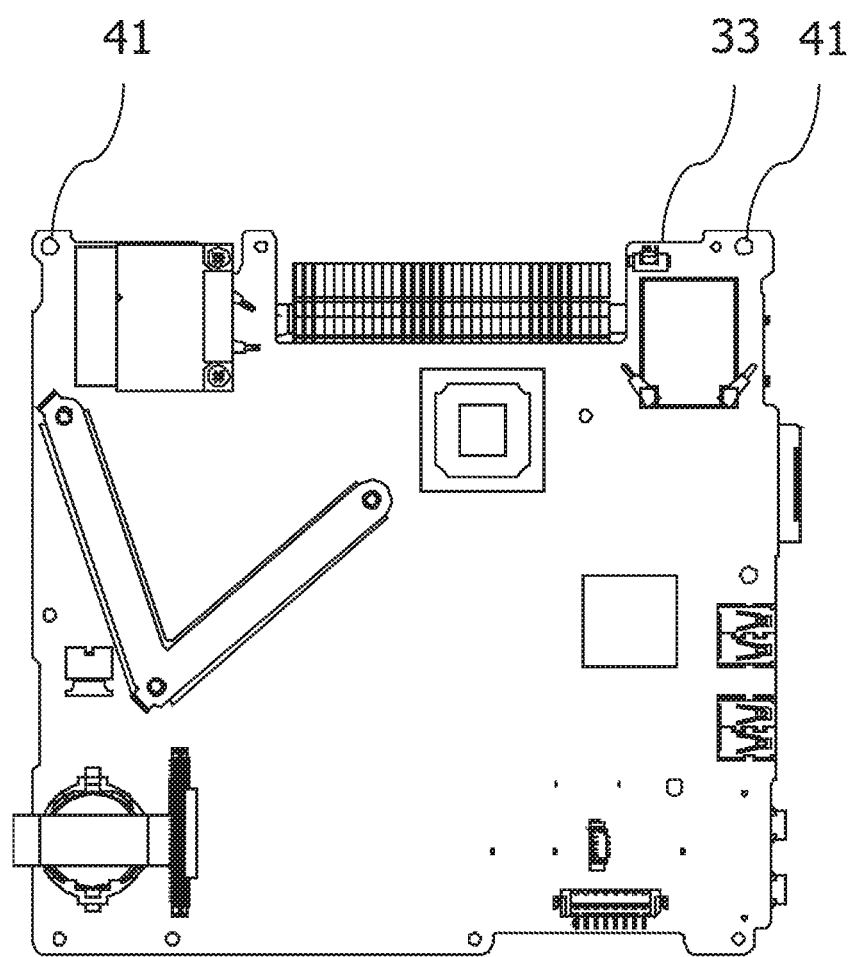
FIG. 14 illustrates a circuit board accommodated in the main unit of the cradle according to the first embodiment.

FIG. 14 illustrates the circuit board 33 accommodated in the main unit 29 of the cradle 200 according to the first embodiment. The circuit board 33 is secured in the main unit 29 of the cradle 200 by securing fixing portions 41 to the fixing portions 45 and fixing portions 46 provided on the cover 36 with screws and the like.

Figure 15:
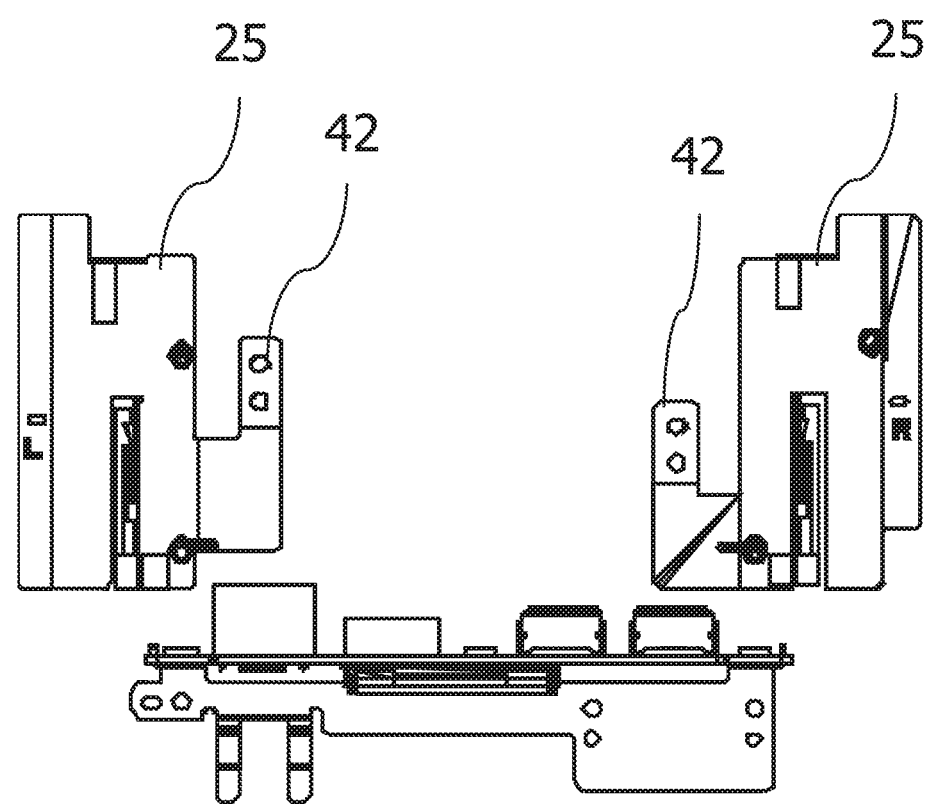
FIG. 15 illustrates antenna units accommodated in the main unit of the cradle according to the first embodiment.

FIG. 15 illustrates the antenna units 25 accommodated in the main unit 29 of the cradle 200 according to the first embodiment. The antenna units 25 are secured in the main unit 29 of the cradle 200 by securing fixing portions 42 to fixing portions 47 provided on the cover 36 with screws and the like.

Figure 16:
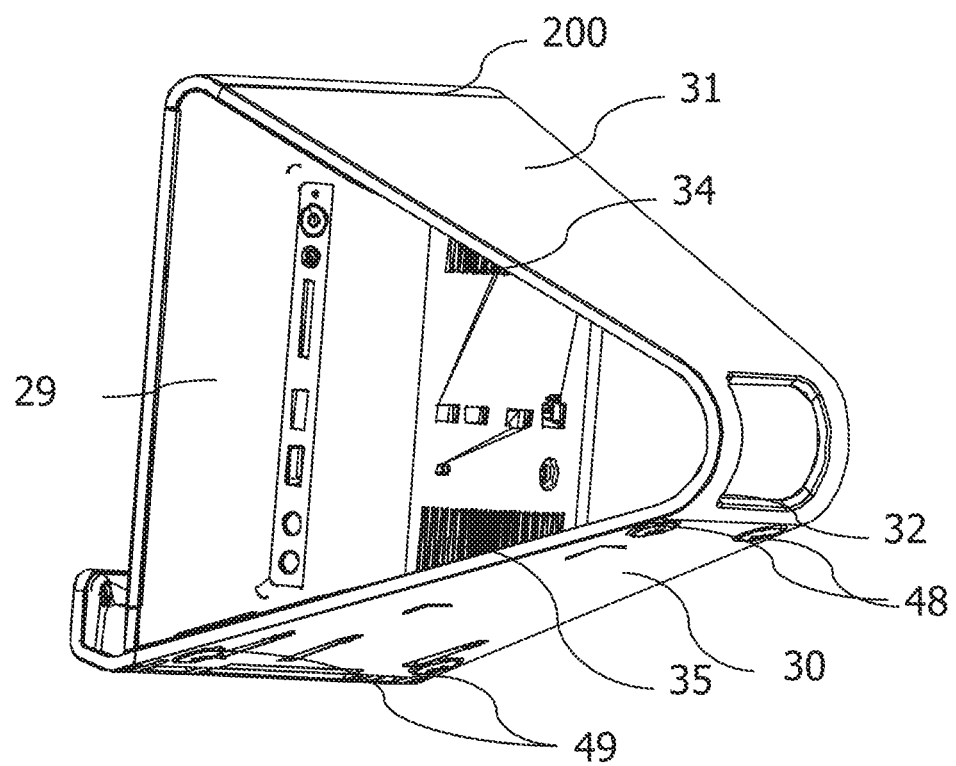
FIG. 16 is a backward perspective view of the cradle according to the first embodiment.

FIG. 16 is a backward perspective view of the cradle 200 according to the first embodiment. As illustrated in FIG. 16, in the main unit 29, the cradle 200 has an outlet port 34, through which air warmed in the main unit 29 is exhausted, and an inlet port 35 through which outside air is inhaled into the main unit 29 to cool the parts in the main unit 29.

Noise and heat come out of the outlet port 34. To keep the noise and heat away from the user, the outlet port 34 is formed at a position on the rear of the cradle 200 when the mounting portion 28 is taken as the front. Since hot air tends to rise, when the outlet port 34 is formed at an upper position of the main unit 29, heat in the main unit 29 is efficiently exhausted to the outside. Since the support portion 31 is disposed above the outlet port 34, which is formed at an upper position of the main unit 29, it is suppressed that dust enters the outlet port 34 and the outlet port 34 is thereby clogged.

An electronic device that is desirably air-cooled may inhale outside air. Since hot air tends to rise, when the inlet port 35 is formed at a lower position in the main unit 29, the air easily flows in the main unit 29.

When, however, the inlet port 35 is present ahead of an exhaust portion or a portion to which exhausted air flows, hot air exhausted from the outlet port 34 circulates in the main unit 29, lowering exhaust efficiency. In view of this, the ventilation hole 32 is formed. The inlet port 35 is preferably present at a lower position in the main unit 29 for the reason described above. If the inlet port 35 is formed so as to face the bottom surface (floor surface), dust in the ambient air is easily inhaled, causing a failure to be likely to occur in the main unit 29. To suppress dust in the ambient air from being inhaled, the bottom portion 30 is provided in the cradle 200. The ventilation hole 32 may be used as a cable clamp to bundle external connection cables connected to the main unit 29.

The support portion 31 has contact portions 48 that receive a pressure generated by a touch operation and transmitted by the support portion 31 and transmit the pressure to a desk or another installation surface. Contact portions 49 are formed on the bottom portion 30; when the cradle 200 is mounted, the contact portions 49 transmit the weight of the main unit 29 to a contact surface. With the cradle 200 illustrated in FIG. 16, the support portion 31 and bottom portion 30 are integrally formed, but the support portion 31 having the contact portions 48 and the bottom portion 30 having the contact portions 49 may be separately formed.

Figure 17:
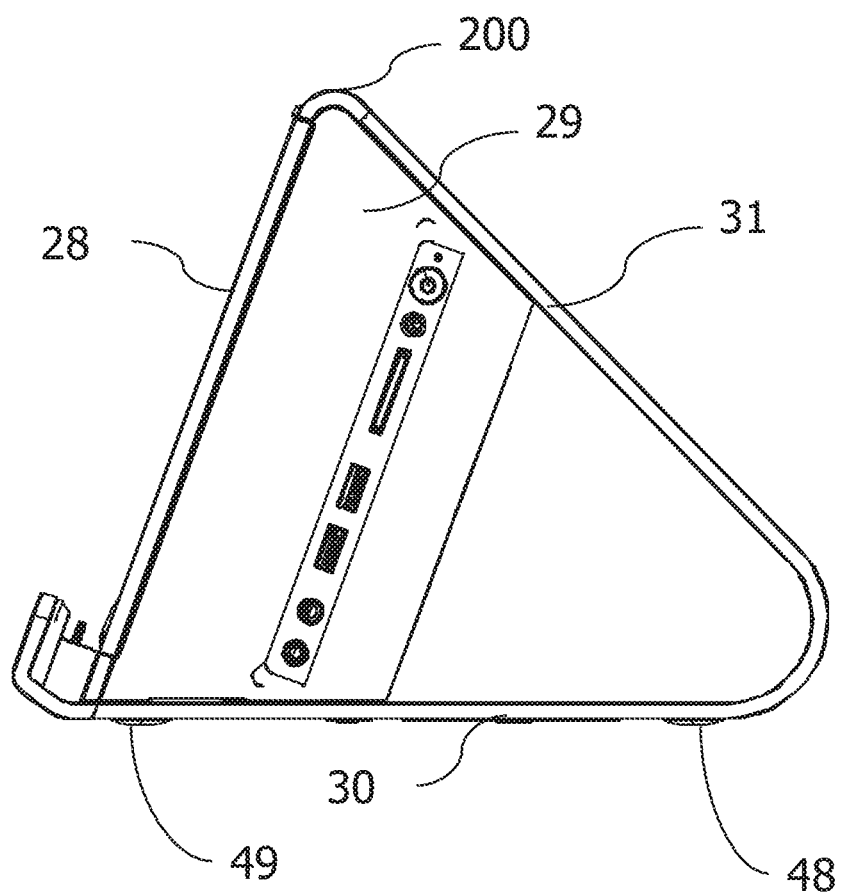
FIG. 17 is a side view of the cradle according to the first embodiment.

FIG. 17 is a side view of the cradle 200 according to the first embodiment. With the cradle 200 illustrated in FIG. 17, the support portion 31 and bottom portion 30 are connected together, they may be separately formed.

Figure 18:
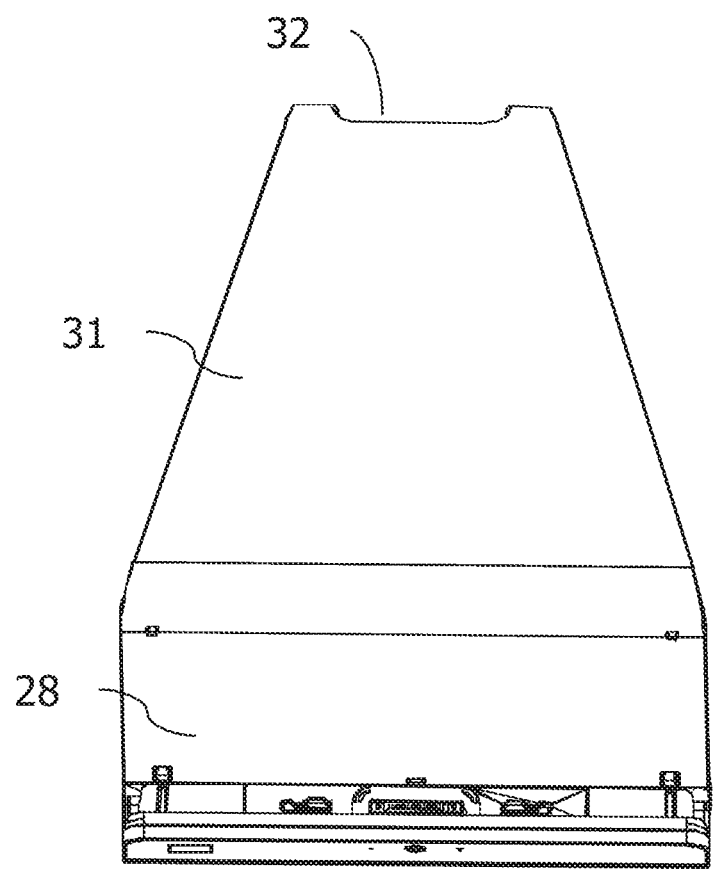
FIG. 18 is a top view of the cradle according to the first embodiment.

FIG. 18 is a top view of the cradle 200 according to the first embodiment. As illustrated in FIG. 18, the cradle 200 is formed so that the width of the support portion 31 is reduced toward the back of the cradle 200 with respect to the width of a portion of the support portion 31 at which it is connected to the mounting portion 28. Therefore, hot air exhausted from the outlet port 34 is released from a narrowed portion of the support portion 31. A width over which the support portion 31 is in contact with a desk or another installation surface and a width over which the support portion 31 is connected to the mounting portion 28 are determined according to a desirable width that is determined from a force applied when, for example, a left end or right end of the display apparatus 4 is touched with the tablet terminal 100 being mounted horizontally on the cradle 200. Since it is desirable for the support portion 31 to have a width that is large to a certain extent, the ventilation hole 32 is formed in the support portion 31 so that the hot air exhausted from the outlet port 34 is released from the ventilation hole 32 without being inhaled from the inlet port 35. Exhausted air flows along the support portion 31. Air to be inhaled flows along the bottom portion 30. Therefore, when the ventilation hole 32 is formed at a portion at which the support portion 31 and bottom portion 30 are connected together, the hot exhausted air is released from the ventilation hole 32.

Figure 19:
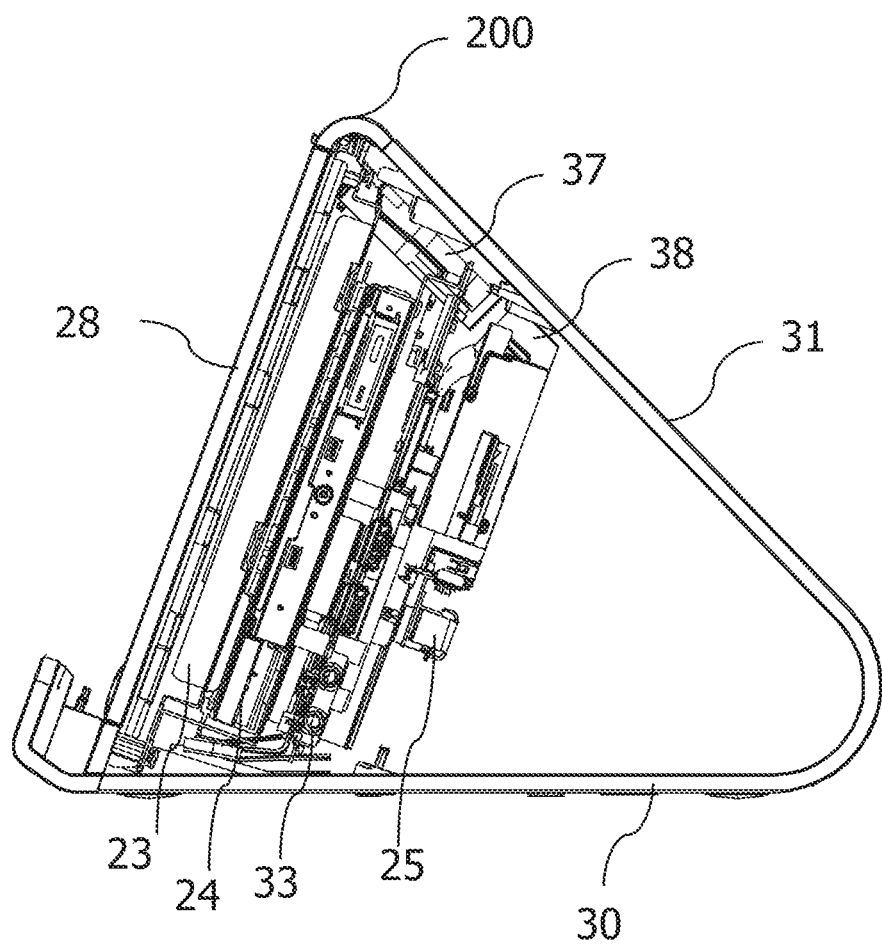
FIG. 19 illustrates the interior of the cradle according to the first embodiment.

FIG. 19 illustrates the interior of the cradle 200 according to the first embodiment. As illustrated in FIG. 19, the optical disk drive unit 23, storage units 24, circuit board 33, and antenna units 25 are stacked on the mounting portion 28, which works as a bottom surface, in the cradle 200. A fan 37 is provided at an oblique angle with respect to the circuit board 33 so that an air flow is formed in the placement of the outlet port 34 and inlet port 35 and air to be exhausted flows along the support portion 31. The fan 37 inhales air from the bottom in FIG. 9 and blows the air in a direction along the support portion 31. A heat sink 38 is placed at a position at which the heat sink 38 is orthogonal to a direction in which air is blown from the fan 37.

Figure 20:
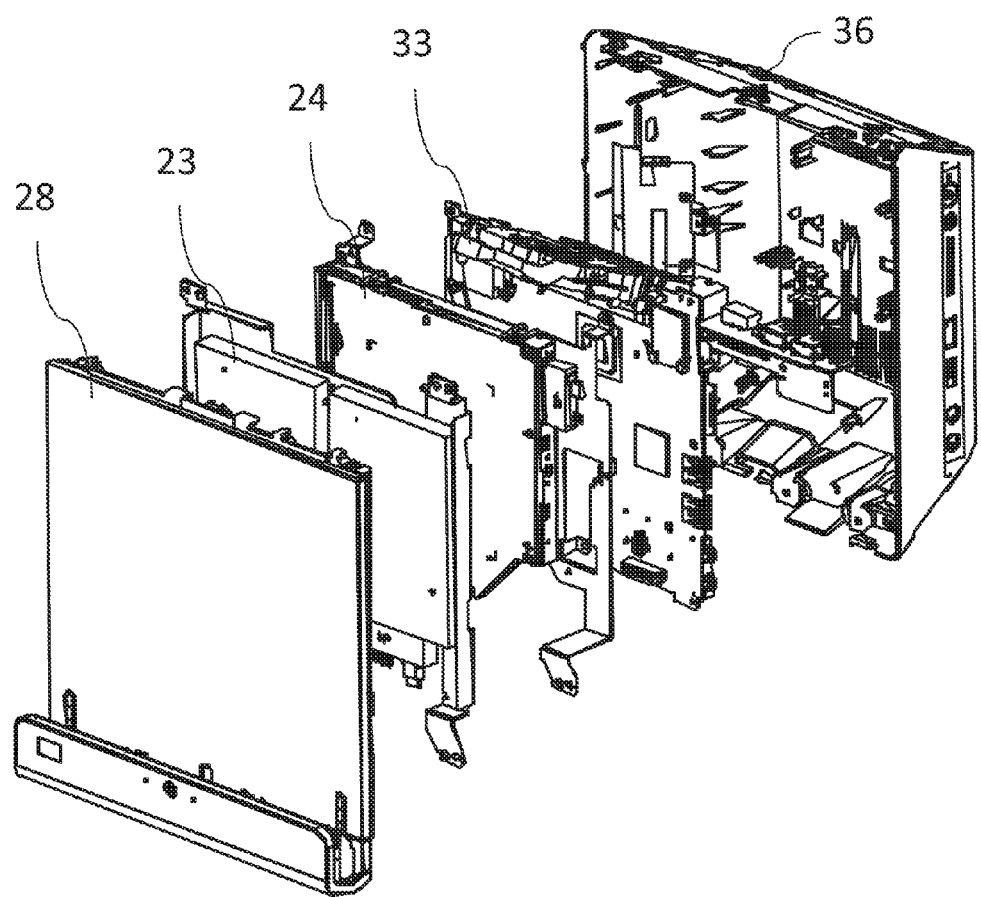
FIG. 20 is an assembling perspective view of the main unit of the cradle according to the first embodiment.

FIG. 20 is an assembling perspective view of the main unit 29 of the cradle 200 according to the first embodiment. As illustrated in FIG. 20, the optical disk drive unit 23, storage units 24, circuit board 33, and antenna units 25 are stacked on the mounting portion 28, which works as a bottom surface, in the cradle 200.

Figure 21:
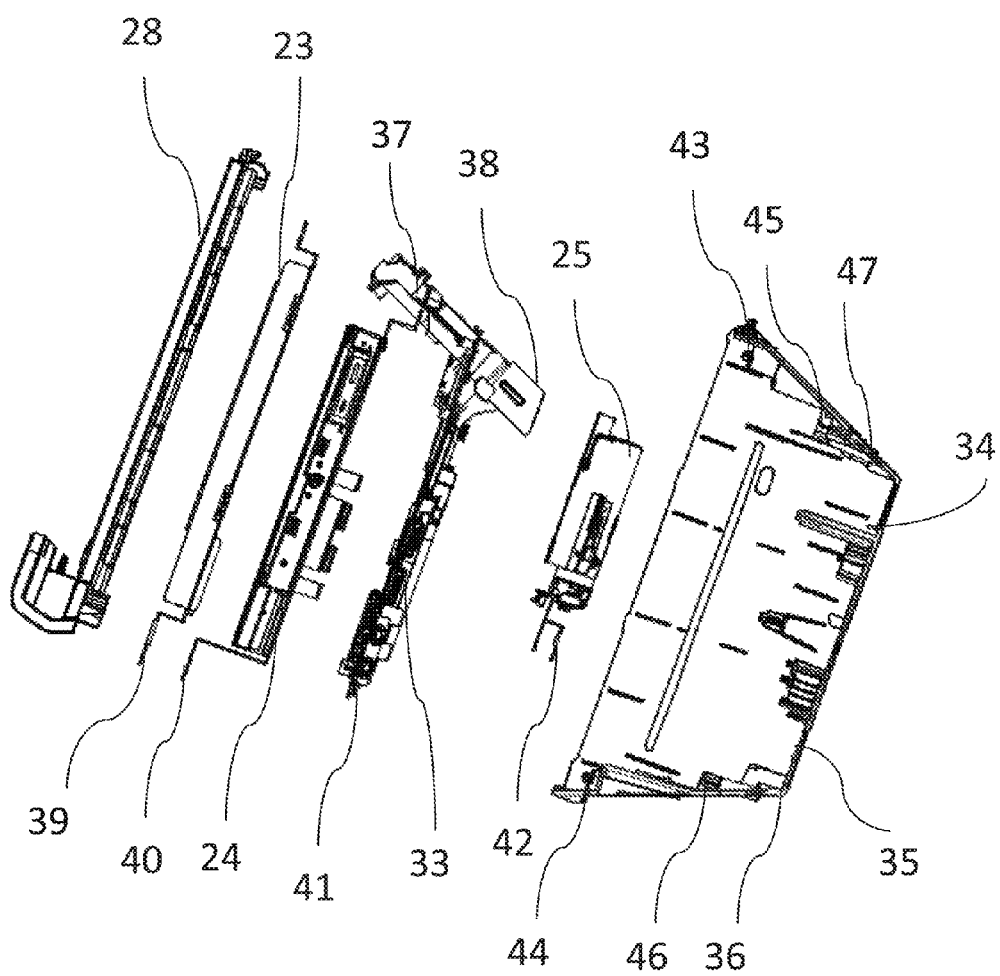
FIG. 21 is an assembling side view of the main unit of the cradle according to the first embodiment.

FIG. 21 is an assembling side view of the main unit 29 of the cradle 200 according to the first embodiment. As illustrated in FIG. 21, to form the cradle 200, an antenna unit 25 (one of the antenna units 25 illustrated in FIG. 15) is assembled to the cover 36, after which another antenna unit 25 (the other of the antenna units 25 illustrated in FIG. 15), the circuit board 33, the storage units 24, the optical disk drive unit 23, and the mounting portion 28 are assembled in that order. The cover 36 is tapered so as to expand from the bottom surface in which the outlet port 34 and inlet port 35 are formed to an opening. The fixing portions 39 provided for the optical disk drive unit 23, the fixing portions 40 provided for the storage units 24, the fixing portions 41 provided for the circuit board 33, and the fixing portions 42 provided for the antenna units 25 are secured to the fixing portions 43, fixing portions 44, fixing portions 45, fixing portions 46, and fixing portions 47 provided on the cover 36 with screws. The fixing portions 47, fixing portions 46, fixing portions 45, fixing portions 44, and fixing portions 43 are disposed along the inclination of the side surface of the cover 36 so as to be placed outside in succession with respect to the center of the cover 36 in that order.

Figure 22:
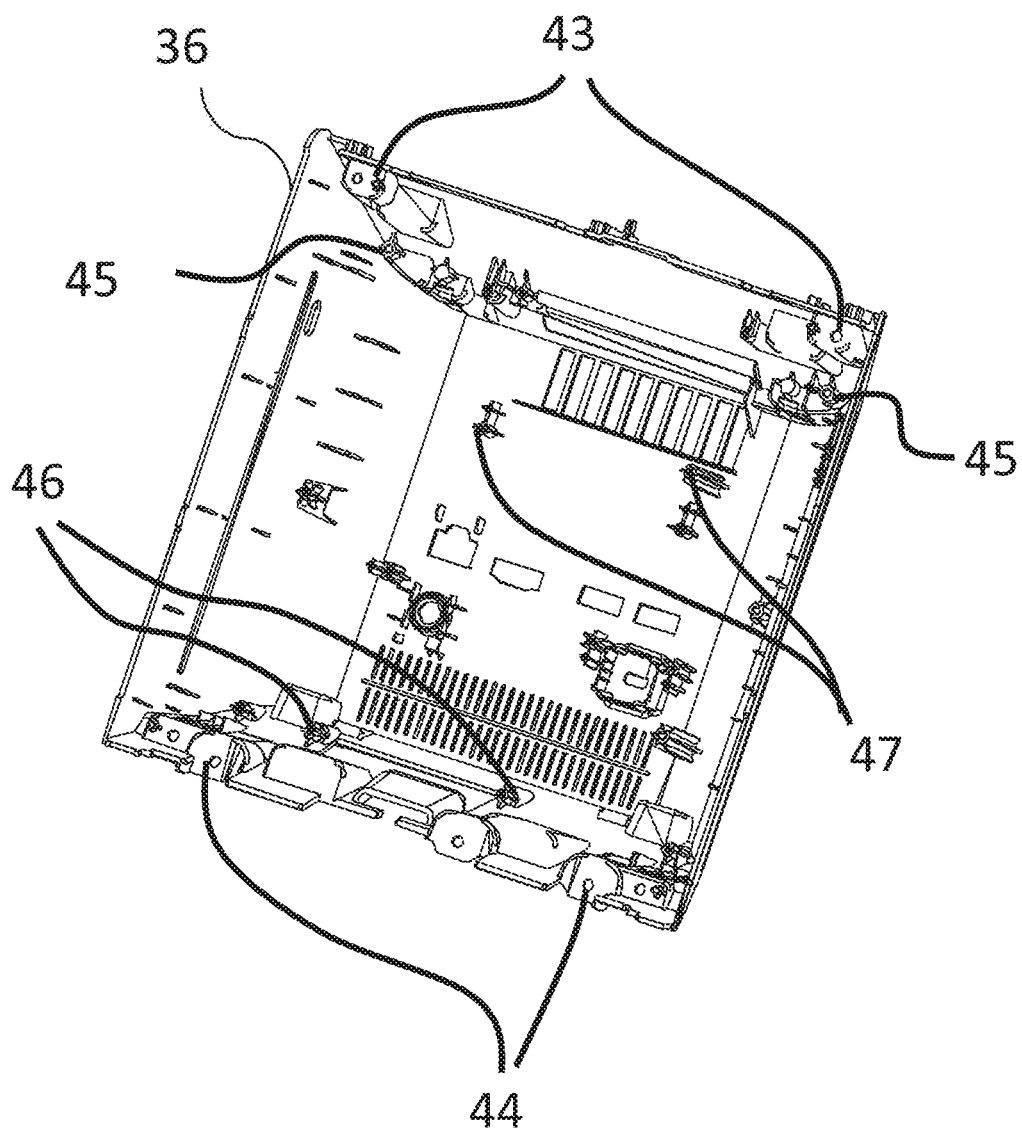
FIG. 22 illustrates a cover for the main unit of the cradle according to the first embodiment.

FIG. 22 illustrates the cover 36 for the main unit 29 of the cradle 200 according to the first embodiment. To the fixing portions 43, the fixing portions 39 on the optical disk drive unit 23, which is mounted in the main unit 29 as a fourth layer, are secured with screws. To the fixing portions 44, the fixing portions 40 on the storage units 24, which are mounted as a third layer, and the fixing portions 39 on the optical disk drive unit 23, which is the fourth layer, are secured together with screws. To the fixing portions 45, the fixing portions 41 on the circuit board 33, which is mounted as a second layer, and the fixing portions 40 on the storage units 24, which are the third layer, are secured together with screws. To the fixing portions 46, the fixing portions 41 on the circuit board 33, which is the second layer, are secured with screws. To the fixing portions 47, the fixing portions 42 on the antenna unit 25, which is a first layer, are secured with screws. Thus, the individual mounted parts are secured to the cover 36. Furthermore, some parts are mounted together with the fixing portions 44 and fixing portions 45 and are secured at the same positions with screws, so processes to accommodate the mounted parts in the main unit 29 are reduced.

This application is not limited to the first embodiment. The technology disclosed in this application can also be applied to, for example, a PC and other information processing apparatuses that include a display unit to which a touch panel that detects a touch operation is attached and also includes an information processing unit that processes information to be displayed on the display unit. This information processing apparatus has: a main unit in which an information processing unit is accommodated and a display unit is provided so that at least part of the display unit protrudes from the main unit; a bottom portion connected to the main unit, the bottom portion being placed on a mounting surface so as to be in contact with the mounting surface, the information processing apparatus being mounted on the mounting surface; and a support portion that supports the main unit, one end of the support portion being connected to the main unit, the other end of the support portion being disposed in a direction away from the display unit side of the main unit, with a space left between the other end and the main unit. With this information processing apparatus, the display unit, for example, is integrated with the main unit so that at least part of the display unit protrudes from the main unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An electronic device comprising:
   a main unit that has a width smaller than a width of a display unit including a touch panel that detects a touch operation, the main unit being structured so that the display unit is provided on the main unit in a state in which the display unit includes a portion that does not overlap the main unit;
   a bottom portion coupled to the main unit, the bottom portion being placed on a mounting surface so as to be in contact with the mounting surface when the electronic device is mounted on the mounting surface; and
   a support portion that supports the main unit, the support portion has one end of the support portion coupled to the main unit and another end of the support portion disposed in a direction away from the main unit with a space left between the another end and the main unit, wherein the main unit includes a case and a circuit accommodated in the case, and the case includes at least a first surface disposed between the bottom portion and the support portion, the first surface having one end on a same side as the bottom portion and another end on a same side as the support portion, and the first surface includes an inlet port formed close to the bottom portion, air being inhaled from the inlet port, and includes an outlet port formed close to the support portion, air in the main unit being exhausted from the outlet port.

2. The electronic device according to claim 1, wherein the support portion has a length enough for the another end to come into contact with the mounting surface when the bottom portion is in contact with the mounting surface.

3. The electronic device according to claim 1, wherein the circuit includes a processing circuit that processes information to be displayed on the display unit.

4. The electronic device according to claim 1, wherein the support portion has an opening through which air that has exhausted from the outlet port and flows along the support portion is released.

5. The electronic device according to claim 1, wherein the case has:
   a second surface connected to the bottom portion and to the one end of the first surface, and
   a third surface connected to the support portion and to the another end of the first surface.

6. The electronic device according to claim 1, wherein the first surface is disposed at a prescribed angle with respect to the bottom portion.

7. The electronic device according to claim 1, wherein the support portion has a width that is reduced from the one end toward the another end.

8. The electronic device according to claim 1, wherein the support portion includes a first contact portion that transmits, to the mounting surface, a force applied by a touch operation to a portion on the touch panel in the portion, on the display unit, that does not overlap the main unit, and
   the bottom portion includes a second contact portion that transmits a weight of the main unit to the mounting surface.

9. The electronic device according to claim 1, wherein the display unit includes a first connection portion, and the main unit includes:
   a mounting portion on which the display unit is removably mounted, and
   a second connection portion electrically coupled to the first connection portion when the display unit is mounted on the mounting portion.

10. The electronic device according to claim 9, wherein the display unit has at least a rectangular shape that is prescribed by a first edge on which the first connection portion is provided and a second edge on which a third connection portion is provided,
   when the display unit is mounted on the mounting portion in a first form, the first connection portion is electrically coupled to the second connection portion, and
   when the display unit is mounted on the mounting portion in a second form, the third connection portion is electrically coupled to the second connection portion.

11. An information processing apparatus comprising:
   a display unit including a touch panel that detects a touch operation;
   a main unit that has a width smaller than a width of the display unit, the main unit being structured so that the display unit is provided on the main unit in a state in which the display unit includes a portion that does not overlap the main unit;
   a bottom portion coupled to the main unit, the bottom portion being placed on a mounting surface so as to be in contact with the mounting surface when the electronic device is mounted on the mounting surface; and
   a support portion that supports the main unit, the support portion has one end of the support portion coupled to the main unit and another end of the support portion disposed in a direction away from the main unit with a space left between the another end and the main unit, wherein
   the main unit includes a case and a circuit accommodated in the case, and
   the case includes at least a first surface disposed between the bottom portion and the support portion, the first surface having one end on a same side as the bottom portion and another end on a same side as the support portion, and
   the first surface includes an inlet port formed close to the bottom portion, air being inhaled from the inlet port, and includes an outlet port formed close to the support portion, air in the main unit being exhausted from the outlet port.

12. The information processing apparatus according to claim 11, wherein the support portion has a length enough for the another end to come into contact with the mounting surface when the bottom portion is in contact with the mounting surface.

13. The information processing apparatus according to claim 11, wherein the support portion has an opening through which air that has exhausted from the outlet port and flows along the support portion is released.

14. The information processing apparatus according to claim 11, wherein
   the case has:
      a second surface connected to the bottom portion and to the one end of the first surface, and
      a third surface connected to the support portion and to the another end of the first surface.

15. The information processing apparatus according to claim 11, wherein the first surface is disposed at a prescribed angle with respect to the bottom portion.

16. The information processing apparatus according to claim 11, wherein the support portion has a width that is reduced from the one end toward the another end.

17. The information processing apparatus according to claim 11, wherein
   the support portion includes a first contact portion that transmits, to the mounting surface, a force applied by a touch operation to a portion on the touch panel in the portion, on the display unit, that does not overlap the main unit, and
   the bottom portion includes a second contact portion that transmits a weight of the main unit to the mounting surface.

18. The information processing apparatus according to claim 11, wherein
   the display unit includes a first connection portion, and the main unit includes:

a mounting portion on which the display unit is removably mounted, and a second connection portion electrically coupled to the first connection portion when the display unit is mounted on the mounting portion.

\* \* \* \* \*